United States Patent [19]

Miyagawa et al.

[11] Patent Number: 5,795,673
[45] Date of Patent: Aug. 18, 1998

[54] METHOD OF RECOVERING USEFUL MATERIALS FROM SPENT SECONDARY BATTERIES FOR ELECTRIC VEHICLES

[75] Inventors: Hiroshi Miyagawa; Ryouichi Shirai, both of Ageo, Japan

[73] Assignee: Mitsui Mining & Smelting Co., Ltd., Tokyo, Japan

[21] Appl. No.: 714,462

[22] Filed: Sep. 16, 1996

[30] Foreign Application Priority Data

Oct. 26, 1995 [JP] Japan .................................. 7-278726

[51] Int. Cl.$^6$ ................................................ H01M 10/54
[52] U.S. Cl. ............................................................ 429/49
[58] Field of Search ................................................ 429/49

[56] References Cited

U.S. PATENT DOCUMENTS 5,429,887  7/1995  Lyman et al. .............................. 429/49
5,456,992  10/1995  Elliott ....................................... 429/49
5,478,664  12/1995  Kaneko et al. ............................ 429/49
5,491,037  2/1996  Kawakami ................................. 429/49

*Primary Examiner*—M. Nuzzolillo
*Attorney, Agent, or Firm*—Flynn, Thiel, Boutell & Tanis, P.C.

[57] ABSTRACT

A method of recovering useful materials from spent secondary batteries for electric vehicles according to the present invention involves a step of cutting a spent secondary battery for electric vehicles into a cover portion and a housing portion, a step of taking out and separating electrode plates from the housing portion, and a step of crushing the electrode plates and dividing the crushed materials into negative electrode substrate, positive electrode plates including a nickel compound and active materials, and separators through the use of pneumatically separating and sieving.

3 Claims, 4 Drawing Sheets

METHOD OF RECOVERING USEFUL MATERIALS FROM SPENT SECONDARY BATTERIES FOR ELECTRIC VEHICLES

FIELD OF THE INVENTION

The present invention relates to a method of disassembling spent nickel metal-hydride batteries, spent nickel-cadmium batteries or the like, preferably used as a secondary battery for, for instance, electric vehicles and recovering useful materials such as plastics, metals, positive electrode plates, negative electrode substrates, nickel compounds and active materials. BACKGROUND OF THE INVENTION As secondary batteries for electric vehicles, the possibility to use lithium ion batteries, nickel metal-hydride batteries, nickel-cadmium batteries, and lead batteries or the like is now under examination, and especially lithium ion batteries and nickel metal-hydride batteries are promising because these types of batteries have an excellent high output density, long service life, and high energy density, all of which are indispensable requirements for an electric vehicle. In this case, a large quantity of spent secondary batteries is discarded, but as they include useful metals such as hydrogen-absorbed alloy (active material of negative electrode), nickel, and cadmium a great deal, processing for recycling these spent secondary batteries is quite important.

As an example of processing for recycling spent secondary batteries, there has been proposed a method of recovering useful metals from spent nickel metal-hydride secondary batteries (Refer to Japanese Patent Laid-Open Publication No. 340930/1994). This recovering method comprises a step of pulverizing spent nickel metal-hydride batteries; a step of removing alkali, organic materials, and ferric or ferrous metals therefrom; either one of (a) a step of sintering the recovered materials, (b) a step of dissolving the recovered materials in mineral acid and then precipitating, filtering, and sintering rare earth metallic ions, and nickel ions, and (c) a step of dissolving the recovered materials in a mineral acid, obtaining fluoride rare earth metals by precipitating rare earth metallic ions as fluorides, filtering and sintering the precipitate and also obtaining nickel oxide by precipitating nickel ions from the residual liquid, filtering and sintering the precipitate; and a step of processing the sintered materials obtained through either one of the steps (a), (b), (c) or through all the steps (a), (b), (c) by the molten salt electrolytic method.

By the way, in the recovery method based on conventional technology, spent nickel metal-hydride batteries are pulverized together with the plastic cases by a two-shaft shearing pulverizer into small pieces. Because of this step, the recovery of plastic pieces can not successfully be executed and, in addition, a complicated step for recovering useful metals such as nickel and hydrogen-absorbed alloys is required, and in any processing flow there exist technologically difficult problems and the recovery efficiency is low.

OBJECT AND SUMMARY OF THE INVENTION

An object of the present invention is to provide a more simple and easier method of recovering useful materials from spent secondary batteries for electric vehicles, which can solve the problems as described above, in which disassembly of spent batteries is executed according to a last-come-first-processing steps to those of assembling the product, which can maintain a high recovery ratio for each material and also can recover useful materials such as plastics, metals, positive electrode plates, negative electrode substrates, nickel compounds and active materials from negative electrode discretely with a high yield respectively, and also which is based on careful considerations for the prevention of combustion due to residual energy or hydrogen-absorbed alloys in the spent batteries during the pulverizing process and is extremely safe when viewed from a view point of security.

To achieve the object as described above, the useful material recovery method according to the present invention is characterized in that the method comprises a step of cutting each spent secondary battery for electric vehicles into a cover portion and a housing portion, a step of taking out electrode plates from the housing portion to separate the electrode plates from the housing portion, and a step of crushing the electrode plates and dividing the crushed materials into negative electrode substrates, a mixture of positive electrode plates including a nickel compound and active materials from the negative electrode, and separators by way of pneumatically separating and sieving.

Also, the useful material recovery method according to the present invention is characterized in that the method includes, in addition to the steps described above, a step of dividing positive electrode plates including the nickel compound and active materials into small pieces of positive electrode plates, a mixture of small particles of positive electrode plates, a nickel compound, and active materials from the negative electrodes.

Furthermore the useful materials recovery method according to the present invention is characterized in that the method includes, in addition to the steps described above, a step of magnetically screening a mixture of small particles of positive electrode plates, a nickel compound, and active materials of negative electrodes into materials magnetically attracted (magnetic product) and those not magnetically attracted (non-magnetic product), and a step of dividing the materials not magnetically attracted into active materials and the nickel compound including a small quantity of active materials by means of attrition and screening according to gravity concentration.

With the useful materials recovery method according to the present invention, disassembly of the spent batteries are executed as described above, the processing sequence is more simple and easier as compared to that based on the conventional technology, and useful materials such as plastics, metals, positive electrode plates, negative electrode substrates, and active materials from negative electrodes can be recovered separately at a high yield. Also, considerations are taken for the prevention of combustion due to residual energy or hydrogen-absorbed alloys in the spent batteries, so that the method is extremely safe when viewed from a view point of security.

DETAILED DESCRIPTION OF THE PREFERRED EMBODIMENTS

Figure 1:
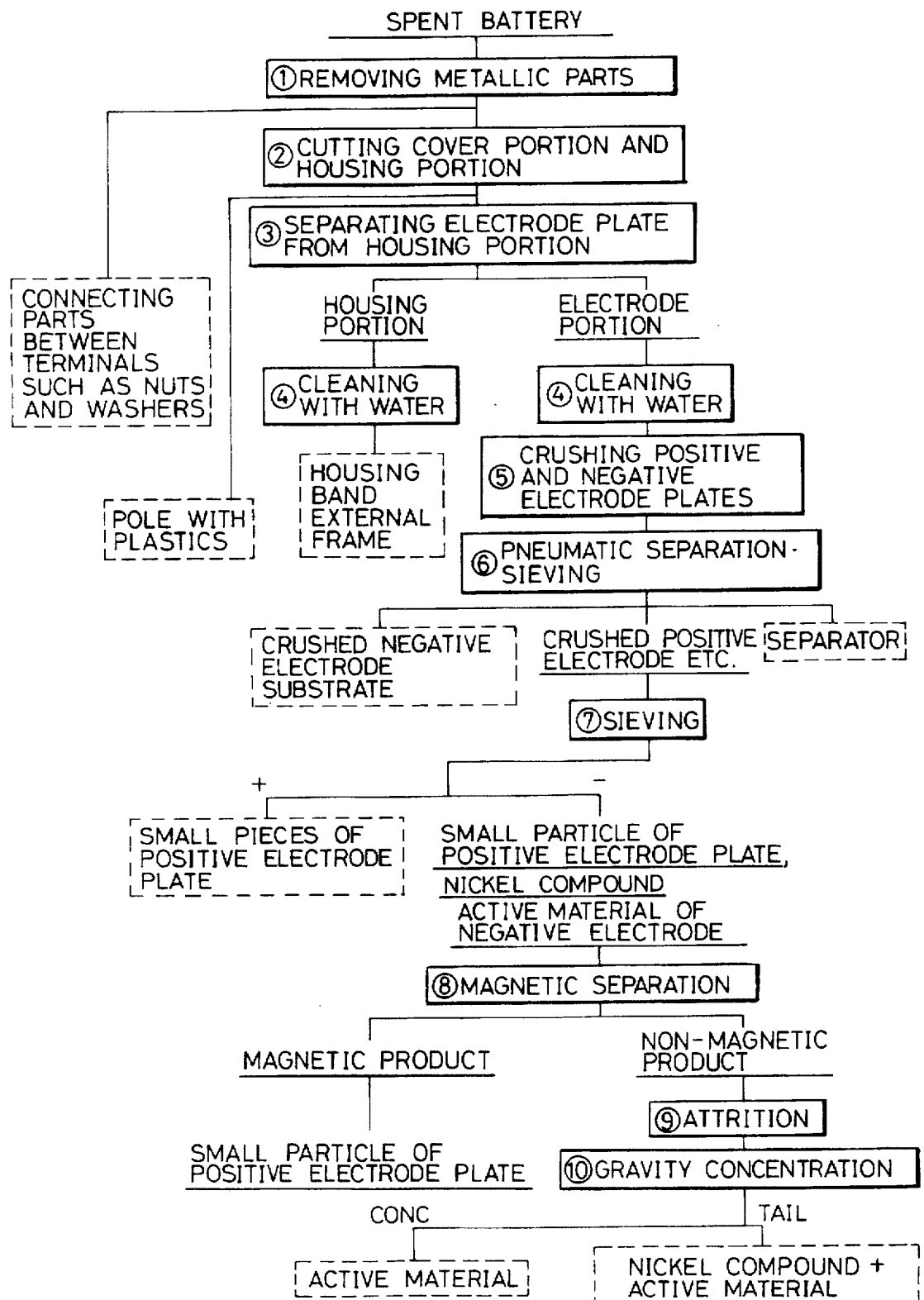
FIG. 1 is a processing flow in a method of recovering useful materials from spent nickel metal-hydride secondary batteries for electric vehicles according to a preferable embodiment of the present invention.

Next description is made for each step for disassembling a spent battery according to the flow shown in FIG. 1.

Figure 2:
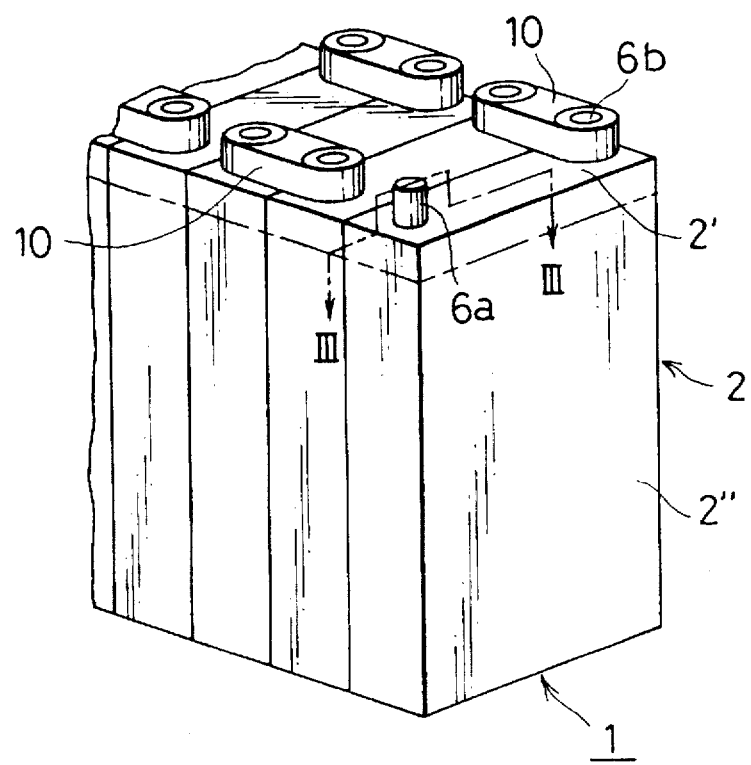
FIG. 2 is a partial omitted perspective view showing spent batteries from a nickel metal-hydride secondary batteries with only a portion (4 batteries in the figure) of one module (10 batteries).
Figure 3:
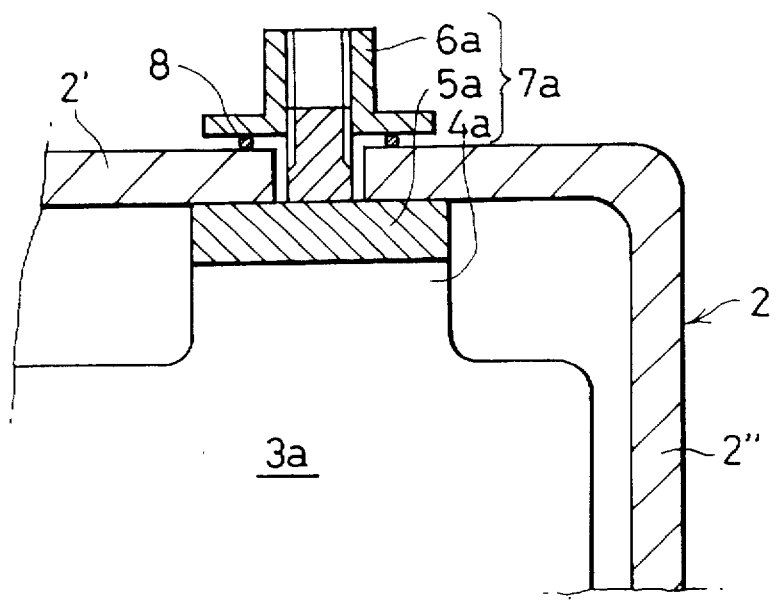
FIG. 3 is a partial enlarged cross-sectional view taken along the line III—III in FIG. 2.

As shown in FIG. 2 and FIG. 3, a spent battery 1 incorporates positive and negative electrode plates 3a(3b) in a plastic case 2. Each of the positive and negative electrode plates 3a (3b) has an electrode plate lead section 4a (4b), the lead section is connected via a lead collecting plate 5a (5b) to a terminal 6a (6b), and the terminal 6a (6b) projects from a top surface of the case 2. The electrode plate lead section 4a (4b), lead collecting plate 5a (5b) and terminal 6a (6b) form a pole section 7a (7b). The reference numeral 8 indicates an O ring. Terminals 6a (6b) of each battery are connected with a connecting metal parts not shown herein and covered with a terminal cover 10. The connecting metal parts is covered by the terminal cover 10 and can not be seen in the figure.

1) Operation for removing metallic parts

This is a step for removing the terminal cover 10 from the spent batteries 1 shown in FIG. 2 and then removing connecting metal parts between the terminals 6a (6b). This work is manually carried out module by module. The removed connecting metal parts such as nuts and washers, etc. are carried outside of the system.

2) Operation for separating a cover portion from a housing portion (Step of cutting an assembly into a cover portion and a housing portion)

This is a preprocessing step for taking out electrode plates and separating electrode plates from negative electrode plates. At first, spent batteries 1 are fixed, and the spent batteries 1 are cut module by module with an electric saw at an upper section of side faces of the housings close to the covers. With this operation, plastic cases for one module are cut off into housing portions 2" thereof and cover portions 2' with terminals 6a (6b) attached thereto, and the former are sent to the next step, while the latter are sent to a step for separating plastics from metals outside the system.

Figure 4:
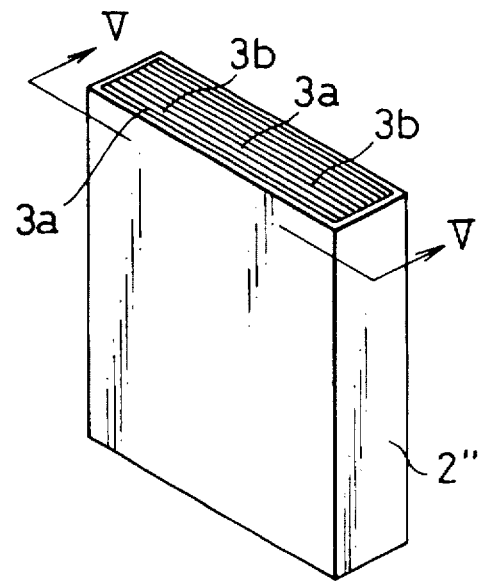
FIG. 4 is a perspective view showing a state where an upper section of a plastic case of a spent battery cell is exposed and the positive and negative electrode plates incorporated therein can be seen from the outside.
Figure 5:
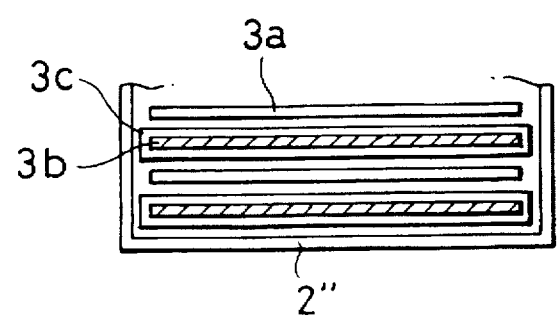
FIG. 5 is a partial transverse flat view taken along the line V—V in FIG. 4.

With the operation described above and as shown in FIG. 4, an upper section of the plastic case for the spent battery 1 is exposed, and the positive and negative electrode plates incorporated therein can be seen from the outside. The reference numeral 3a indicates a positive electrode plate, the reference numeral 3b indicates negative electrode plates, and the negative electrode plate 3b is enclosed by the separator 3c as shown in FIG. 5. FIG. 5 shows the positional relation between the negative electrode plate enclosed by the separator 3c and the positive electrode plate 3a, and as shown in this figure, they are disposed alternatingly. FIG. 5 shows only a portion thereof.

It should be noted that the positive electrode plate 3a is manufactured by appropriately mixing a polyacrylic salt such as carboxymethyl cellulose and polyacrylic soda and nickel hydroxide and a material such as $Co(OH)_2$, CoO, and metallic cobalt if necessary to prepare a nickel compound, filling the nickel compound in a substrate having a three-dimensional structure such as a foaming metal substrate, a meshed sintered textile substrate, or a felt-plated substrate with non-woven fabric metal plated thereon, drying the substrate, and executing roller pressing thereto. The negative electrode plate 3b is manufactured by mixing metal-hydride alloy powder, high molecular weight binding agent and conductive agent, added if necessary, to prepare active material, and applying and coating it in a conductive substrate as an electric charge collector, drying it, and executing roller pressing thereto. The separator 3c is made from a textile of a single substance such as nylon, polypropylene, polyethylene, or a hybrid textile obtained by way of mixed spinning of these high molecular weight fibers.

3) Operation for separating a housing portion from electrode plates (Step for dividing an assembly into a housing portion and electrode plates)

Figure 6:
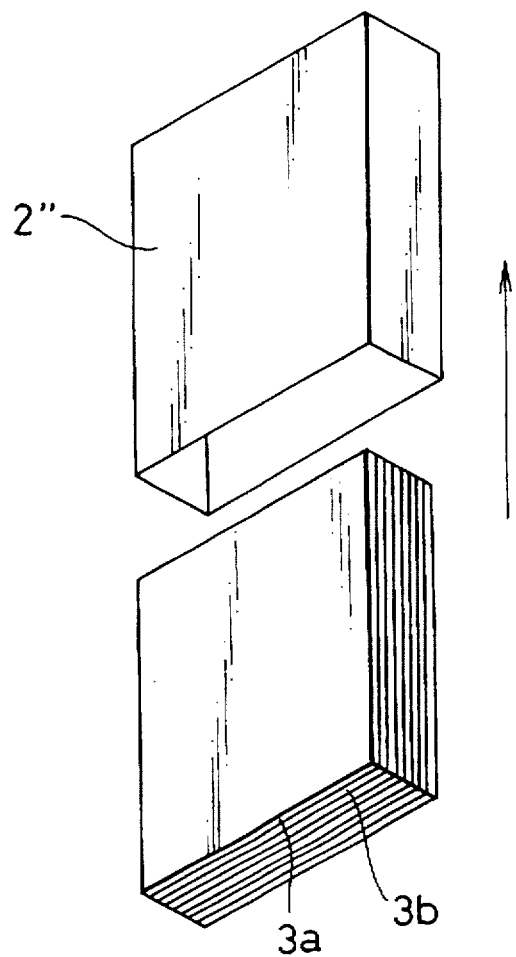
FIG. 6 is a perspective view showing a state where electrode plates have been taken out from the housing portion.

This is a step for taking out an electrode plate. As shown in FIG. 6, by applying a shock to the housing portion 2" in 2) held upside down (with the cutting surface faced downward) module by module, only the electrode plates drop from the housing portion 2". The housing portion 2" and the electrode portion are carried by each conveyor respectively.

4) Operation for cleaning electrode plate and a housing portion with water

Potassium hydroxide is used in a battery, so the inside of the battery is in a high alkali state. For this reason, an operation for cleaning with water is executed for safety in handling and easy separation of positive electrode plates from negative ones in a latter disassembly step of electrode plates closely adhered to each other. After an external frame is removed, the inside of the housing portion 2" is cleaned with water. The housing having been cleaned with water, the band and external frame are sent to outside of the system. The electrode plates are put in a cleaning tank one by one to wash off alkali adhered thereto. A hard cleaning with a strong mechanical force makes the compound or active materials leave from the electrode plates, so that a soft cleaning is advantageous in this step. After the operation of cleaning with water is executed to a certain degree, it is necessary to neutralize the waste water used for cleaning and replace it with a new one.

5) Operation for crushing electrode plates

This is a step for separating the positive electrode plate 3a from the negative electrode substrate plate 3b by making use of a difference in ease of each electrode substrate being crushed. Positive and negative electrode substrate plates are crushed into pieces each having a different size (only the positive electrode plate 3a is crushed into small pieces). A positive electrode plate is made of a substrate such as foamed nickel, which is a porous and fragile structure, and a nickel compound filled therein, so the plate can easily be crushed into small pieces by giving a mechanical shock thereto or being bent. On the other hand, a negative electrode plate is made of a substrate such as a thin iron plate with the surface plated with nickel (or a thin nickel plate), which is flexible and tough and an active material is coated thereon. The plate can hardly be crushed by giving a mechanical shock, pulling, or bending. Due to the structural difference between the positive electrode plate and the negative electrode plate, when crushed with, for instance, an impact breaker such as an impeller breaker, positive electrode plate 3a is crushed into small pieces, while the negative electrode plate is bent and distorted with a portion of the active materials dropping therefrom but the negative electrode substrate plate itself is not broken (It is needless to say that a degree of crushing can be adjusted by changing a rotational speed of the impeller or a space between an impeller and an impact plate. At the same time, the separator 3c covering the negative electrode plate 3b is removed or a portion thereof is cut. As to other crushing methods, there is a method in which a fragile positive electrode plate is crushed into small pieces, when it passes between a plurality of rollers being deformed, due to a load generated in association with compressing and bending by the rollers. To make the positive electrode plate smoothly move between the rollers without slipping, it is effective to provide projections or claws on a surface of each roller so that the electrode plate will be hooked in and caught by a surface of each roller. It may be said that this method is quieter and consumes a smaller quantity of energy as compared to the crushing method with a mechanical impact described above. Because the mechanical impact generated by the latter is small, there is a merit that a quantity of active materials dropping from a negative electrode plate or a quantity of nickel compound dropping from a positive electrode plate is small, but there is a problem that the separator 3c is not removed nor cut off.

6) Operation for pneumatically separating and sieving

The electrode plates crushed in step 5) above comprises distorted negative electrode plates 3b, substrate separators having been removed or being removed from negative electrode plates, positive electrode plates crushed into small pieces, and active materials and a nickel compound dropping from the positive and negative electrode plates. In this step, these materials are separated from each other by making use of a difference in specific gravity as well as in size between the materials.

Sizes of products generated by crushing are as shown in the table below.

| Type | Crushed size (mm) |
| --- | --- |
| Positive electrode plate | 10 to 50 |
| Negative electrode substrate | 70 or more |
| Mixed powder of nickel compound and active materials | 5 or less |
| Separator | 50 or more |

At first, these materials are screened with a sieve with a mesh of 50 mm, and are divided into negative electrode plates 3b substrate and separators 3c, each having a plus size (over size than the mesh), and to positive electrode plates 3a and a mixed powder of the nickel compound and active materials, each having a minus size (under size than the mesh). The negative electrode plates 3b substrate and separators 3c having a plus size are pneumatically separated from each other making use of the fact that the separator is made of a polypropylene cloth much lighter than the negative electrode substrate. In practical operation, the materials are sieved with a trommel (rotary sieve) with a mesh of around 50 mm, at the same time air is blown into the trommel, and the separators 3c like cloth and having a light weight are separated outside of the trommel.

7) Sieving

This is a step for separating positive electrode plates from a mixed powder of the nickel compound and active materials, both of which pass through the sieve in step 6) above. The materials are divided with a vibrating sieve with a mesh of 10 mm into positive electrode plate 3a in the plus size side (over size) and mixed power of a nickel compound and active materials in the minus size side (under size). Positive electrode plates 3a crushed into pieces smaller than 10 mm are mixed in the materials in the minus size side.

8) Magnetic separation (Screening with magnetism)

The materials which passed through the sieve in step 7) mainly comprises mixed powder of a nickel compound and active materials, but positive electrode plate 3a having been crushed into small particles are mixed in the powder. This step is for separating the particles of positive electrode plates from the mixed powder of the nickel compound and active materials.

The foamed nickel constituting the positive electrode plate 3a exhibits the ferromagnetic characteristics, while the nickel compound and active materials do not exhibit magnetism. So, when the materials are processed in a magnetic screening machine, the positive electrode plates 3a are magnetically attracted and separated from the mixed powder of the nickel compound and active materials which are not magnetically attracted. The separated small particles of positive electrode plates 3a are put together with the positive electrode plates 3a separated in step 7) above.

9) Attrition

As the particles of the nickel compound and active materials not attracted magnetically in step 8) are partially bonded to each other, and do not exist as single substance particles. Unless each component particles exists as single substance particles, the materials can not be separated from each other in screening using specific gravity, and for this reason, as a preprocessing for screening making use of specific gravity in the next step, attrition is executed for surface cleaning of the particles of the nickel compound and active materials (including removal of oxides) as well as for separation of particles of the nickel compound and active material so that each material can be separated from each other as single substances.

The materials not having been attracted magnetically (non-magnetic product) are mixed with water to make a slurry, and then fed to an attrition machine, where the materials are strongly agitated to separate particles constituting the nickel compound and active materials.

10) Gravity concentration (Screening according to specific gravity)

In the products of step 9) above, particles of the nickel compound and active materials are present as single substances respectively. Screening according to specific gravity is executed to separate the materials from each other making use of a difference in specific gravity of each material.

The specific gravity of the particles constituting the nickel compound and active material is 3.55 and 7.03 respectively (Picnometer method), and, as to the form of each particle, the nickel compound is spherical, while the active material has a rectangular form, and the nickel compound tends to be screened out as a light-weight material, and the active materials tend to be screened as a heavy- weight material. For instance, in a case of table mineral screening as an example of mineral screening making use of specific gravity, most of the materials separated as a heavy-weight material is active materials, and the nickel compound is substantially not mixed therein, so that the materials can be recycled as active materials. In the light-weight materials. The nickel compound and minute active materials coexist. The intermediate weight materials include active materials having a relatively large size and the nickel compound, and in the actual flow, the intermediate weight products are again returned to the table.

What is claimed is:

1. A method of recovering materials from spent secondary batteries used in electric vehicles, said method comprising the steps of:

providing a spent secondary battery used in an electric vehicle, said spent secondary battery comprising a battery case containing a positive electrode comprising a substrate and a nickel compound, a negative electrode comprising a substrate and active materials and a separator for separating the negative electrode from the positive electrode;

cutting the battery case to form a cover portion and a housing portion containing the positive electrode, negative electrode and separator;

separating the cover portion from the housing portion;

removing the positive electrode, negative electrode and separator from the housing portion;

crushing the positive electrode, negative electrode and separator to form crushed materials; and separating the crushed materials into the crushed negative electrode substrate, crushed active materials, crushed positive electrode substrate, crushed nickel compound and crushed separator by pneumatic separation and sieving.

2. The method of claim 1, additionally comprising the steps of separating the crushed active materials, crushed positive electrode substrate and crushed nickel compound into pieces of the positive electrode substrate and a mixture of particles of the positive electrode substrate, the nickel compound and the active materials.

3. The method of claim 2, additionally comprising the steps of: separating the mixture of particles by magnetic screening into materials that are magnetically attracted and materials that are not magnetically attracted and separating the materials that are not magnetically attracted from each other by attrition and screening by gravity separation.

* * * * *